United States Patent [19]

Weber

[11] 4,091,057

[45] May 23, 1978

[54] METHOD FOR INJECTION MOLDING LENSES

[76] Inventor: Hermann P. Weber, 5506 Beckford Ave., Tarzana, Calif. 91356

[21] Appl. No.: 719,356

[22] Filed: Sep. 1, 1976

Related U.S. Application Data

[62] Division of Ser. No. 606,774, Aug. 22, 1975, Pat. No. 4,008,031.

[51] Int. Cl.² ............................................. B29D 11/00
[52] U.S. Cl. .......................................... 264/1; 264/328; 425/808
[58] Field of Search ........................... 264/1, 328, 329; 425/808

[56] References Cited

U.S. PATENT DOCUMENTS

| 2,233,057 | 2/1941 | Luce | 425/808 |
| 2,333,131 | 11/1943 | Tillyer et al. | 264/1 |
| 2,516,373 | 7/1950 | Ehlert et al. | 264/1 |
| 3,240,854 | 3/1966 | Ewer | 264/1 |
| 3,902,693 | 9/1975 | Crandon et al. | 425/808 |

FOREIGN PATENT DOCUMENTS 597,171   5/1960   Canada ..................................... 264/1

Primary Examiner—James B. Lowe
Attorney, Agent, or Firm—Blakely, Sokoloff, Taylor & Zafman

[57] ABSTRACT

A method and apparatus for injection molding thermoplastic lenses, such as prescription eyeglass lenses, in a single injection molding operation into a finished single vision or multifocal blank which does not require additional molding or polishing. Movable optical inserts (dies) are forced apart by injected polycarbonate, then the inserts are urged together forcing a portion of the injected polycarbonate into a pocket.

8 Claims, 10 Drawing Figures

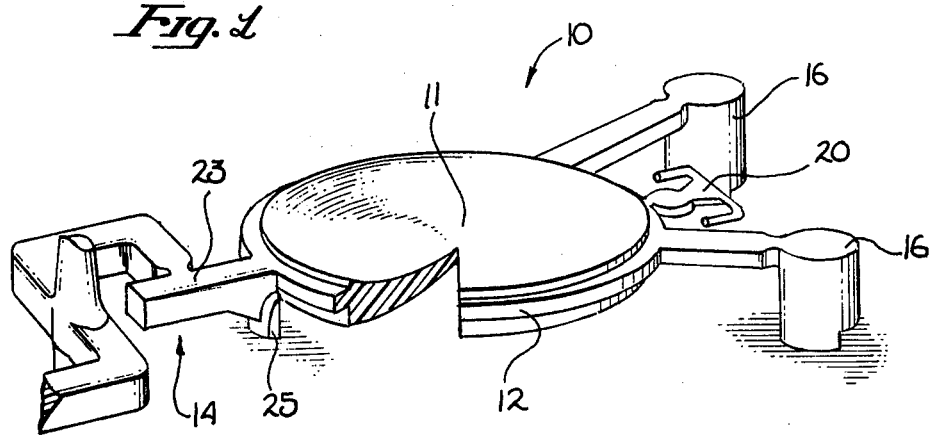
Fig. 1
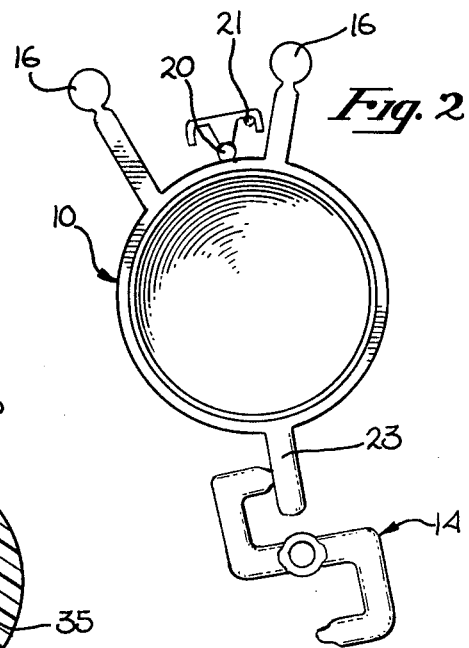
Fig. 2
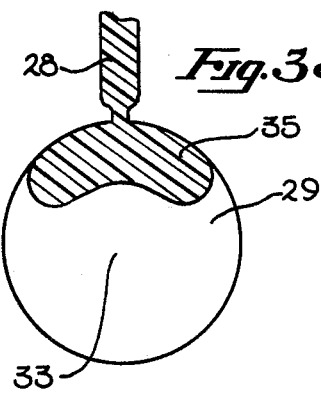
Fig. 3a
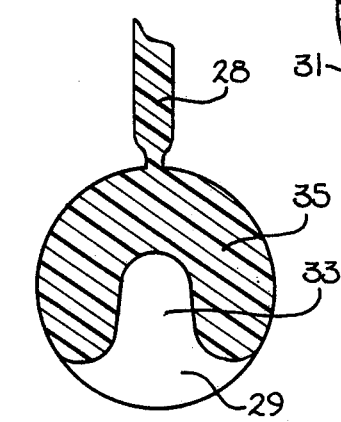
Fig. 3b
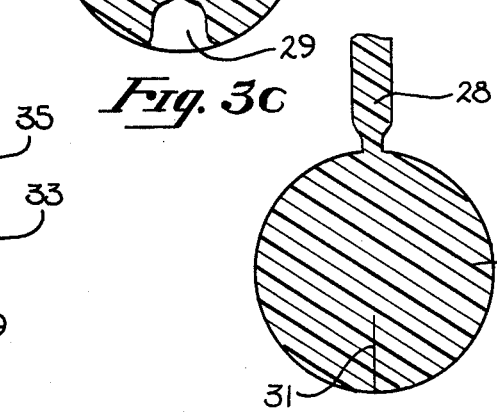
Fig. 3c
Fig. 3d

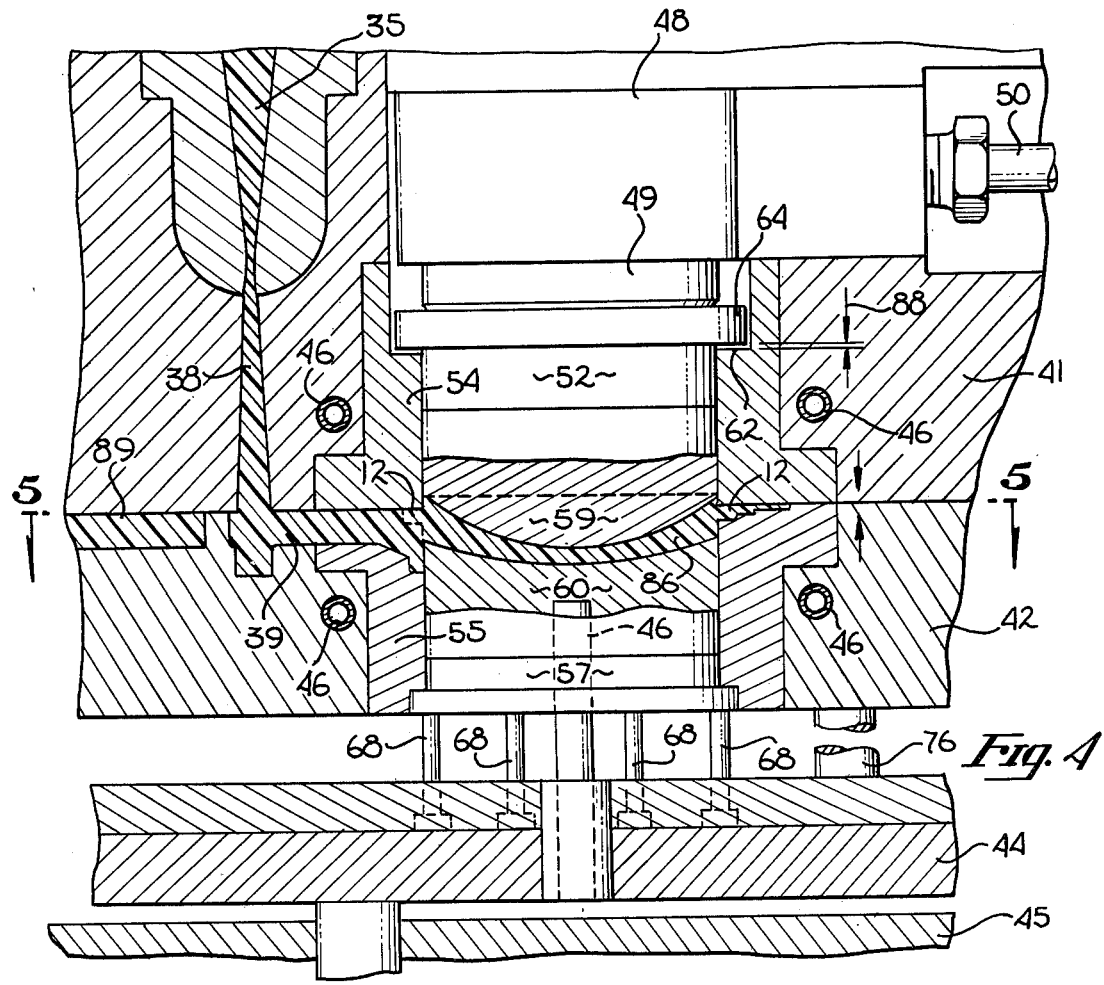
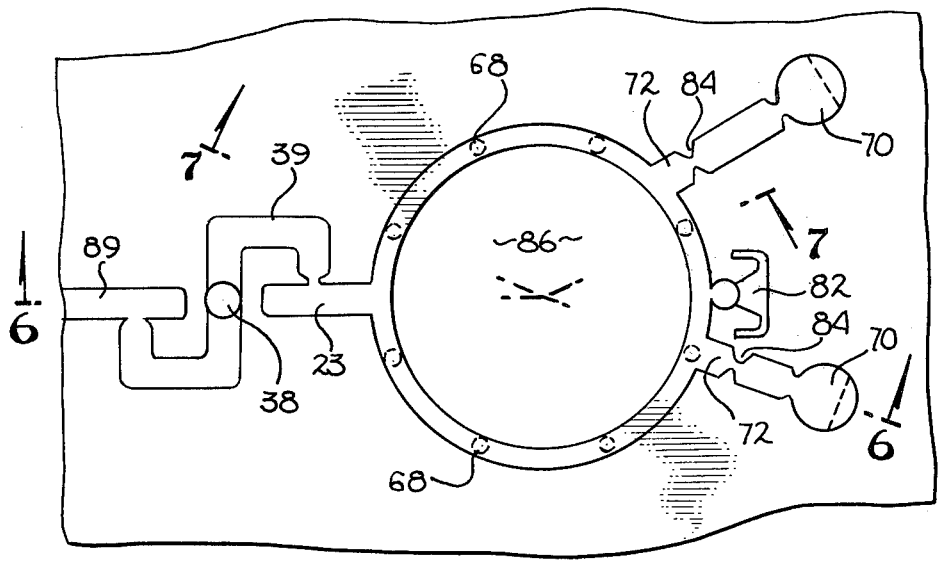

METHOD FOR INJECTION MOLDING LENSES

This is a division of application Ser. No. 606,774, filed Aug. 22, 1975, now U.S. Pat. No. 4,008,031.

FIELD OF THE INVENTION

The invention relates to the field of molding apparatuses and techniques for lenses.

PRIOR ART

There have been several attempts, in the prior art, to mold ophthalmic lenses. One such method and apparatus is shown in U.S. Pat. No. 2,473,588. In accordance with the teachings of this patent, blanks are first produced by cutting or grinding. Following the fabrication of the blanks, the blanks are then compression molded to the desired optical shape. In other prior art teachings, blanks are formed by injection molding techniques, and then through compression molding formed into their final shape. In one instance a protective coating is placed on the blanks, prior to compression molding to their final shape. (See U.S. Pat. No. 3,862,261, Columns 9 and 10).

One problem inherent in injection molding a minus or negative lens in a single injection molding operation is that the plastic flow within the cavity defining the lens tends to first flow to the thicker, outer portion of the cavity, and then finally flow through the thinner center portion. At the seam where the flow from the outer portion of the cavity meets, a knit line often occurs making the resultant lens unusable, or requiring substantial polishing or compression molding. This problem is particularly acute for lenses which are thinner in their center, such as a concave lens used to correct myopia (minus lenses). This conventional plastic flow, and the resultant knit line, will be discussed in more detail in conjunction with FIGS. 3a through 3d. A similar knit line problem associated with plus-lenses occurs.

Another problem associated with the formation of a lens in a single injection molding operation is that during the curing of the plastic, shrinkage occurs which results in an uneven and wavy exterior surface on the finished lens blank and bubbles and other imperfections in the interior of the lens causing optical distortions and aberrations unacceptable for prescription lenses and instrument lenses.

Ideally, a lens should be produced in a single injection molding operation and as will be seen the presently invented method and apparatus provides for the injection molding of an optical lens which results in a finished lens blank. The finished blank may be thin (approximately one millimeter) at its center so as to result in an optically correct, light weight and aesthetically pleasing eyeglass lens which is shatter proof.

SUMMARY OF THE INVENTION

An apparatus and method is disclosed for producing a finished optical blank which may be used for an eyeglass lens, or the like. The invented apparatus and process is particularly adaptable for lenses which are thinner in the center, such as a concave, or double concave (minus or negative) lens, including single vision, multifocal and cylindrical lenses. The injection molding apparatus utilized in the present invention includes an inner press disposed within an outer, conventional, injection molding apparatus. The inner press includes optical inserts defining an optical lens cavity. This cavity, once filled with a clear thermoplastic, such as acrylic or polycarbonate, produces the finished lens blank. The cavity includes an inlet port into which the molten plastic is injected, in a conventional manner. One or both of the optical inserts which define the optical cavity, move so as to increase the volume (particularly the thickness) of the cavity when the molten plastic is first injected into the cavity. The cavity also includes an outlet port spaced apart from the inlet port which is coupled to a self adjusting overflow pocket. After the molten plastic is injected into the cavity the inner press urges the optical inserts together, forcing a predetermined portion of the molten plastic through the outlet port into the pocket. The resultant (thinner) cavity defines the finished optical lens blank.

This apparatus and method eliminates the knit line associated with conventional plastic flow, and furthermore compensates for the shrinkage associated with the curing of the blank. The resultant blank is an optically precise configuration. The process and apparatus is suitable for both plus and minus lenses.

It is an object of the present invention to provide an apparatus and method which allows a finished optical blank to be produced in a single injection molding operation.

BRIEF DESCRIPTION OF THE DRAWINGS

FIG. 1 is a perspective view of a finished blank produced in accordance with the present invention with a cut-away section used to illustrate the thinner center of the blank.

FIG. 2 illustrates the finished blank of FIG. 1 hung on a hanger which hanger is formed concurrently with the molding of the finished blank.

FIGS. 3a, 3b, 3c, and 3d illustrate conventional plastic flow, and the formation of a knit line associated with such flow. These figures are used to discuss the prior art problems associated with the fabrication of a finished blank in a single injection molding operation.

FIG. 4 is a cross-sectional view of an injection molding apparatus built in accordance with the present invention.

FIG. 5 is a plan view illustrating the cavity defined by the dies or optical inserts of the apparatus of FIG. 4 taken through section line 5—5 of FIG. 4.

DETAILED DESCRIPTION OF THE INVENTION

Figure 6:
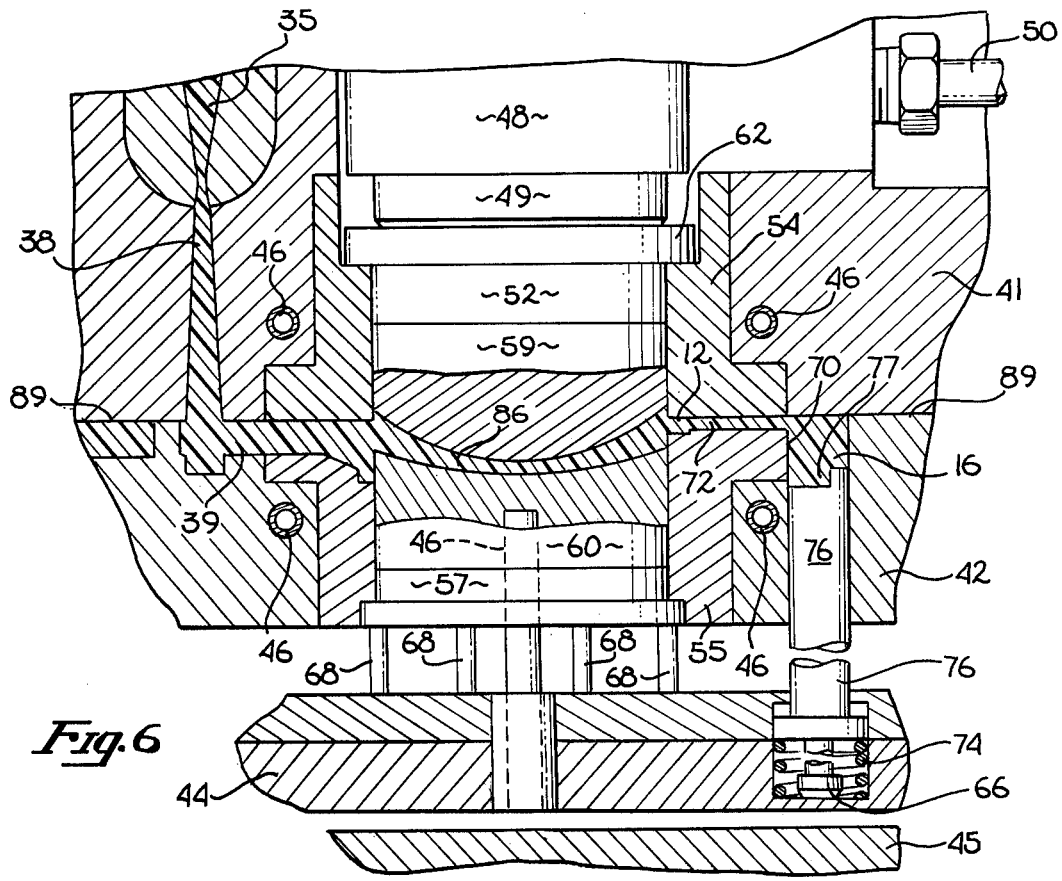
FIG. 6 is an additional cross-sectional view of the apparatus of FIG. 4 taken through the angled section line 6—6 of FIG. 5. This view is utilized to particularly illustrate one of the transfer or overflow pockets.

The present invention discloses an apparatus and method for fabricating a finished optical blank which blank may be utilized for eyeglasses, or the like. The resultant finished blank produced with the present invention requires little, or no, polishing and the blank may be readily cut or edged to any desired peripheral shape such that the lens may engage an eyeglass frame, instrument, or the like.

Before describing the present invention, however, the problems associated with injection molding a lens will be described in order that the present invention be more readily understood. Referring first to FIG. 3a a cavity 29 of an injection molding apparatus is illustrated which includes an inlet 28. The injected molten plastic 35 is illustrated as the plastic first enters the cavity 29. Assume for sake of discussion that the lens being fabricated within cavity 29 has a thinner center 33, such center being thinner than the outer edge of the lens. As the plastic 35 enters the cavity 29 it tends to flow to the outer perimeter of the cavity 29, since the cavity is thicker in this region. In FIG. 3b the plastic 35 is again illustrated as it continues to fill the cavity 29. As may be seen in this figure, the plastic 35 does not immediately flow into the thinner center 33 of the cavity 29 but rather continues to advance about the outer rim of the cavity. In FIG. 3c the continued flow of the plastic 35 is illustrated, however, in this figure as may be seen, the plastic has flowed through the thinner center of the lens. As the plastic meets within the thinner center of the cavity a knit line 31 develops at the seam along which the flow meets. In FIG. 3d the cavity is illustrated completely filled with the plastic 35, and the knit line 31 which is inherent in conventional plastic flow (for any cavity having a thin center) is illustrated. This knit line prevents the use of the resultant blank as an optical lens without additional treatment, such as compression molding or polishing.

As will be seen the present invention through the use of transfer or overflow pockets, and through the use of movable optical inserts prevents the formation of this knit line, particularly for lenses which are thinner in their center.

Before describing the apparatus a brief description of the finished blank 10 of FIG. 1, will be given since it will be helpful in understanding the apparatus. The finished blank 10 includes a lens area 11 which is edged to any appropriate shape, such as a shape required to fit an eyeglass frame. Disposed about the exterior of the lens area 11 is the annular rim 12 which is used to eject the blanks. The inlet runner or spruce 23 shows the flow of the molten plastic as it enters the cavity defining the blank 10. In the presently preferred embodiment a tip 25 is defined by the cavity, this tip allows the plus curved lens to be placed on a flat surface without scratching the bottom surface of the blank 10. Also defined by the cavity is a hanger 20. This hanger allows the finished product to be hung from a pin 21, shown in FIG. 2, or other device during subsequent processing of the finished blank 10. A pair of overflow spruces 16 illustrate the effects of compressing the molten plastic after the plastic has entered the cavity. As will be explained once the cavity is filled, the dies are compressed forcing or squeezing predetermined amounts of molten plastic into pockets which define the overflow spruces 16.

Figure 7:
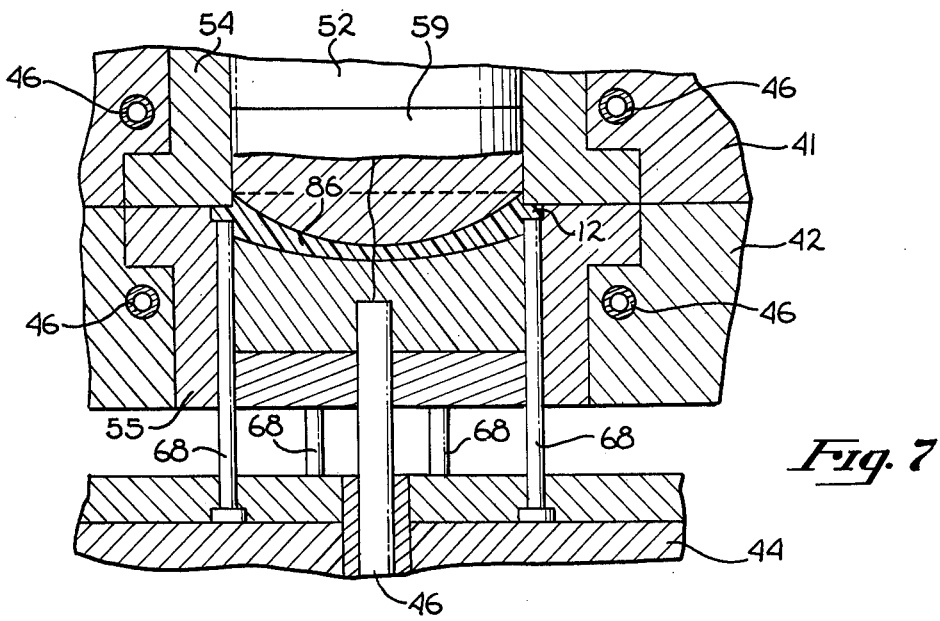
FIG. 7 is a partial cross-sectional view of the apparatus of FIG. 1 taken through the angled section line 7—7 of FIG. 5, and particularly illustrates the ejection pins.

Referring to FIGS. 4, 6 and 7, the presently preferred embodiment of the apparatus employs a compression molding apparatus disposed within a conventional injection molding machine. The conventional injection molding machine includes an upper block 41 and a lower block 42 which meet at a mating surface 89. Disposed within these blocks is an injection nozzle 35 for injecting molten plastic. A plurality of heating rods 46 are disposed within these blocks (and also below the cavity 86) for heating the entire injection apparatus, including the optical inserts 59 and 60. The nozzle 35 communicates with cavity 89 through passageways 38 and 39. The blocks 41 and 42 are secured together through a hydraulic system, exerting, by way of example, a hundred tons of force.

The disclosed apparatus includes an upper interior block 54 and a lower interior block 55. Within these generally cylindrical blocks is disposed a hydraulic cylinder 48. A piston 49 which terminates in a flange 62 cooperatively engages the cylinder 48 for exerting pressure upon the plastic within cavity 86. A spacer 52 is disposed between the flange 62 and an upper optical insert or die 59. At the lower end of cavity 86 a spacer 57, supported from platform 45, is disposed directly below, and in contact with, the lower optical insert or die 60. Thus, the cavity 86 is substantially defined by the adjacent surfaces of the upper and lower dies 59 and 60. Passageway 39 passes through the blocks 54 and 55 in order that the nozzle 35 communicates with the cavity 86.

An hydraulic inlet line 50 is coupled to the cylinder 48 for providing hydraulic fluid to the cylinder when the plastic contained within cavity 86 is to be compressed. The travel of the piston 49 is shown by dimension 88 of FIG. 4; this travel is limited by the distance between the flange 64 and the annulus 62 defined by the upper block 54. However, in the presently preferred embodiment, the travel of pistons 49 (and die 59) is determined by the period of time during which pressure is applied to the plastic within cavity 86 and by other means as will be discussed.

The surface of the dies 59 and 60 defining the cavity 86 are fabricated from a suitably hard metal or glass, which typically is highly polished with a precise, compensated, curve configuration in order that the finished blank has an optically clear, distortion free surface. Such optical inserts or dies are known in the prior art. Moreover, the curved surfaces of these inserts may be varied, by changing the dies 59 and 60 to obtain desired lens shapes or powers.

A plurality of ejector pins 68 are disposed about the circumference of the cavity 86 and contact the rim 12 of the finished blank to urge the blank from the cavity once the blank has been properly cured and the dies have been separated. These pins are coupled to the movable ejection platform 44. Standard known injection devices may be used for this application.

Referring to FIGS. 5 and 6, in the presently preferred embodiment, two transfer or overflow pockets 70 are defined within the block 42. These pockets communicate with the cavity 86 through the passageways 72. The passageways 72 are disposed generally facing the inlet passageway 23. While in the presently preferred embodiment two pockets 70 are illustrated, a single pocket (or several pockets) may nonetheless be used, and in an embodiment where a single pocket is used the passageway communicating with this single pocket is disposed directly opposite the inlet passageway. A piston 76 is disposed for movement within the pocket 70. The lower end of the piston 76 is urged upward by a spring 74 mounted between the lower end of piston 76 and the ejection platform 44. The upper surface of the piston 76 includes a notch 77, the purpose of which will be explained later in this application. An adjustment 66 is disposed at the lower ends of the piston to limit the travel of the pistons 76. These adjustments 66 in part determine the final volume of the cavity 86. When the blank is ejected, the pistons urge the spruces 16 from the pockets. Gates 84 may be disposed within the passageways 72 as a means of limiting the flow into the pockets 70 from the cavity 86.

The inlet passageway 39 as is best illustrated in FIG. 5 communicates with the cavity 86 through a right angle bend 23. This right angle (which is known in the prior art) is used to diffuse the inlet flow of molten plastic. Also illustrated in FIG. 5 is a hanger cavity or void 82 which defines the blank hanger 20 illustrated and discussed in conjunction with FIGS. 1 and 2.

The entire apparatus shown in FIGS. 4, 5, 6 and 7 may be readily fabricated utilizing known technology.

Assume a lens is to be fabricated on the apparatus shown in FIGS. 4, 5, 6 and 7 and that the desired dies 59 and 60 have been placed with the apparatus. In the presently preferred embodiment a polycarbonate or other thermoplastic is metered into the nozzle 35 at a temperature of approximately 520°–560° F. Also, through use of the heating rods 46, the cavity is heated to a temperature of approximately 260°–275° F. Prior to the injection of the molten plastic into the cavity 86 from the vessel 36 the outer blocks 41 and 42 are held secured against one another at the mating surface 89 with a force in the order of magnitude of one-hundred tons.

When the plastic is injected into the cavity 86 via passageways 38 and 39, the force of the molten plastic against the die 59 causes the die to rise, thereby increasing the volume of cavity 86 and its thickness. During this period of time, little, or no, force is exerted on die 59 through the piston 49. Since the cavity increases in volume, and particularly since the center of the cavity has a greater thickness because of the movement of die 59, the knit line described in conjunction with FIG. 3 is not formed. In the presently preferred embodiment the injection of the molten plastic into the cavity 86 takes approximately 10 seconds.

Following the injection of the molten plastic into the cavity 86, hydraulic fluid is applied to the cylinder 48, through line 50, causing the upper die 59 to compress the molten plastic within cavity 86. By way of example, such pressure is exerted for a period of approximately 30 seconds with a total force of approximately 20 tons. During this period of time molten plastic is forced from the cavity 86 through the passageways 72 into the pockets 70. Referring briefly to FIG. 6 the notch 77 allows the plastic flowing into pocket 70 to exert an axial force against the piston 76 such that the piston 76 is forced downward against the force of spring 74. It is during this period of time that the overflow spruces 16 of FIG. 1 are formed. The pressure on the die 59 causes the volume and thickness of cavity 86 to decrease, and particularly decreases the center thickness of the cavity. In this way, a lens of a desired thickness may be fabricated; including bifocal lenses.

In the presently preferred embodiment, the travel of die 59 is controlled by the length of time elapsing after molten plastic enters cavity 86 and pressure is applied to the die 59 through piston 49. Also the final volume of cavity 86 is controlled by the length of time that pressure is applied to the die 59 by piston 49. Thus, if a thinner lens is desired, a shorter period of time is allowed to lapse between the injection and application of pressure, and the pressure is maintained for a longer period of time. If a thicker lens is desired, a longer period of time is allowed to run before pressure is applied and the pressure is maintained for a shorter period of time. The amount of flow from cavity 86 may also be controlled by the force exerted on the piston 76 by the spring 74, through the use of the gates 84 shown in FIG. 5 and through use of the adjustments 66. While positive stops are not employed on piston 49 in the presently preferred embodiment, such stops may be alternately employed.

Following the period of time during which the overflow or transfer occurs, the pressure is relieved from the cylinder 48 allowing a release of the pressure applied to the plastic within cavity 86. Typically, the pressure is released for two to three seconds. During this period of time the overflow into the pockets 70 ceases, since the molten plastic begins to cure. For some applications this release of pressure may not be necessary before curing begins.

Following this two or three second period of time, force (of approximately twenty tons) is again applied to the die 59. This force continues for a period of approximately two minutes, during which time the plastic within the cavity is cured. The pressure applied to the die during this period of time assures that the surface of the blank remains smooth and optically correct, since as the plastic cures it tends to shrink and pull away from the die surfaces. However, since the die is being urged against the blank, a smooth surface matching the compensated optical inserts is maintained during this curing period. The resultant blank is distortion free.

If the cavity 86 is sufficiently thick during the period of time that the plastic is injected into the cavity, the knit line associated with the prior art injection techniques is, to a large extent, eliminated. Also, during the period of time that the overflow occurs into the overflow pockets, any knit line that may be present, to some extent, is flushed from the cavity. For this reason in the presently preferred embodiment, the outlet ports leading to the overflow cavities are disposed opposite the inlet port.

While in the disclosed embodiment the upper die 59 moves relative to the fixed lower die 60, it will be appreciated that the lower die may be moved towards a fixed upper die, or that both dies may move. Moreover, while in the disclosed embodiment electric heating rods 46 are shown, other heating means, such as fluid heating means may be utilized to heat the apparatus. Also a vacuum exhaust may be applied to the cavity 86 prior to the time that flow begins into nozzle 35. Conventional vacuum exhaust may be used for this purpose. Cooling fluids may also be used to cool the cavity 86 during curing.

It will be appreciated that the times, temperature and forces set forth in the above example may be varied.

Also, in the presently preferred embodiment, the pressure exerted against the upper die 59 by the injected molten plastic is used to raise this die, thus increasing the volume of cavity 86. However, the die may be raised mechanically prior to the time that plastic is injected into the cavity with the same result.

When the finished blank is removed from the cavity 86 by the pins 68 its appearance is that of the finished blank 10 illustrated in FIGS. 1 and 2. This blank may then be coated with a scratch resistant coating, in a manner known in the prior art. Other known operations such as cutting, coloring, cleaning, etc. may be performed on the finished blank.

A problem similar to the knit line problem discussed in conjunction with FIG. 3 occurs for lenses which are thinner at their outer edges than at their centers, such as large plus lenses with approximately one millimeter edge thickness. The disclosed method and apparatus may be used to solve this problem.

Thus, an apparatus and method for injection molding a lens has been disclosed. The lens is fabricated in a single injection molding operation, and unlike prior art methods, a pre-formed blank is not required. With the disclosed apparatus many high quality ophthalmic and instrument lenses may be produced from a single injection molding apparatus, at substantially lower costs than is possible with prior art techniques and apparatuses.

I claim:

1. A method for forming a thermoplastic optical lens blank in an injection molding apparatus where said apparatus includes an optical cavity for defining said optical lens blank comprising the steps of:

injection molten plastic into said cavity at a first aperture along the edge of said cavity when said cavity has a volume greater than said optical lens said greater volume to assure better flow into the thinner section of said cavity; and compressing said cavity such that the thickness of said cavity is decreased so as to define said optical lens blank, thereby causing an flow of molten plastic from said optical cavity at a second aperture along said edge of said cavity, said second aperture spaced-apart from said first aperture;

whereby said injected molten plastic flows into a cavity having a greater thickness than the thickness of said optical lens blank, thereby avoiding problems associated with conventional plastic flow into a thin cavity.

2. The method defined by claim 1 including the step of curing said lens blanking in said cavity after said flow of molten plastic from said cavity has ceased.

3. The method defined by claim 2 wherein pressure is applied to said blank during said curing so as to correct for shrinkage during curing.

4. The method defined by claim 3 wherein said molten plastic comprises polycarbonate.

5. The method defined by claim 4 wherein said cavity is heated prior to said injecting of molten polycarbonate into said cavity.

6. A method for forming a thermoplastic optical lens in a cavity comprising the steps of:

injection molten plastic into said cavity at a first aperture along the edge of said cavity when said cavity has a volume greater than said optical lens, said greater volume of said cavity obtained by the force of said injected molten plastic acting upon the surfaces defining said cavity during said injection of said molten plastic;

applying first pressure to said injected molten plastic in said cavity so as to urge molten plastic to flow from said cavity through a second aperture along said edge of said cavity, said second aperture spaced-apart from said first aperture;

applying second pressure to said molten plastic as said molten plastic cures;

whereby an optical lens is formed.

7. The method of claim 6 wherein said first pressure decreases the thickness of said cavity thereby urging said molten plastic from said cavity, said first pressure being applied until said cavity substantially defines said optical lens.

8. The method defined by claim 6 wherein said molten plastic comprises a molten polycarbonate.

* * * * *